United States Patent [19]
Alt et al.

[11] 3,876,225
[45] Apr. 8, 1975

[54] MULTI-CIRCUIT BRAKE INSTALLATIONS FOR VEHICLES

[76] Inventors: Claus-Christian Alt, Lorbeerstrasse 46, Stuttgart-Heumaden; Alf Müller, Gumpenstrasse 36, Bittenfeld, both of Germany

[22] Filed: June 15, 1972

[21] Appl. No.: 262,946

Related U.S. Application Data

[62] Division of Ser. No. 36,751, May 13, 1970, abandoned.

[30] Foreign Application Priority Data
May 17, 1969 Germany.......................... 1925173

[52] U.S. Cl............................ 280/96.2 R; 188/345
[51] Int. Cl............................................. B60t 11/24
[58] Field of Search....... 188/345; 280/96.2, 96.2 R, 280/93; 303/6 C

[56] References Cited
UNITED STATES PATENTS

| | | | |
|---|---|---|---|
| 2,152,074 | 3/1939 | McInnerney | 188/345 |
| 3,492,018 | 1/1970 | Burckhardt et al. | 280/96.2 |
| 3,620,548 | 12/1971 | Van Winsen | 280/96.2 R |

FOREIGN PATENTS OR APPLICATIONS

| | | | |
|---|---|---|---|
| 1,146,888 | 5/1957 | France | 188/345 |

*Primary Examiner*—Kenneth H. Betts
*Attorney, Agent, or Firm*—Craig & Antonelli

[57] ABSTRACT

A multi-circuit brake installation for vehicles having at least three separate and independent braking circuits for braking the wheels. A master cylinder is provided with at least three pistons arranged serially therewithin. These pistons serve to separate the braking circuits and are arranged to collapse against an adjacent piston or end wall of the cylinder upon failure of the braking circuit immediately in communication with the respective pistons. One arrangement with three braking circuits has a separate circuit for each of the front steerable wheels and a third circuit for the two rear wheels. A steering connection for this one arrangement provides for a negative or small roll radius at the steerable front wheels.

19 Claims, 3 Drawing Figures

FIG. 1
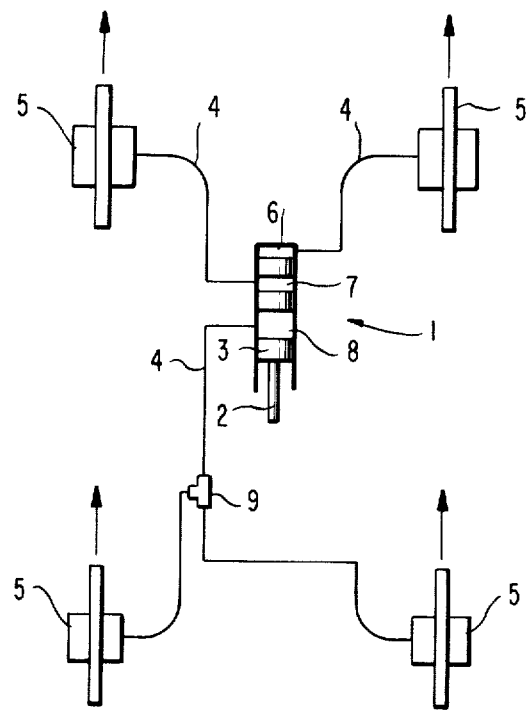
FIG. 2
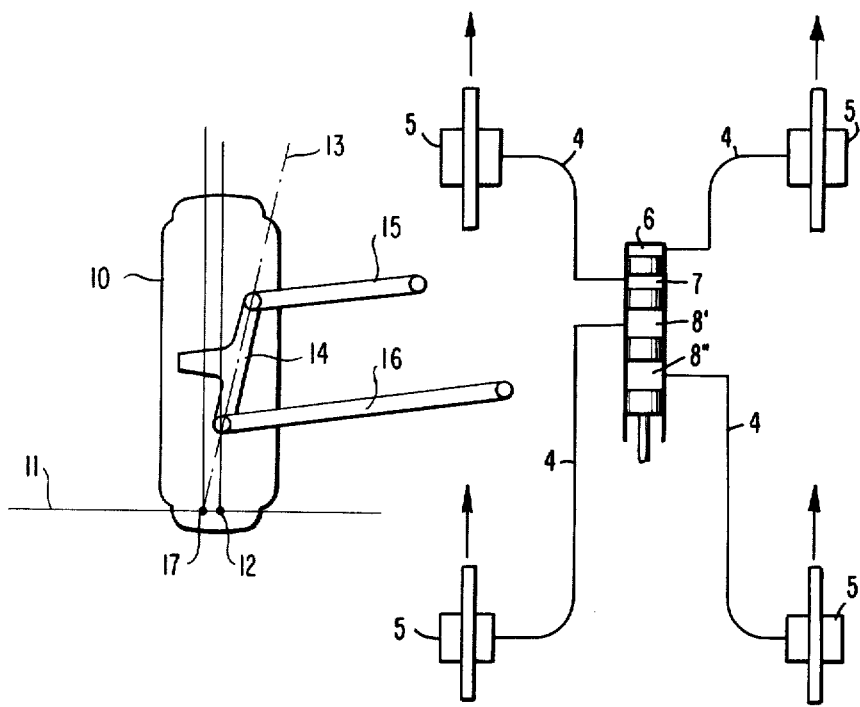
FIG. 1A

MULTI-CIRCUIT BRAKE INSTALLATIONS FOR VEHICLES

This is a division of application Ser. No. 36,751 filed May 13, 1970, now abandoned.

The present invention relates to a simple multi-circuit (or multi-cycle) brake installation for vehicles, especially for motor vehicles, in which a brake pressure is produced in a hydraulic system, that is equipped with a master brake cylinder, by the force of the foot or by an auxiliary force, the brake pressure causing a brake force at the clamping elements of disk brakes or drum brakes.

Multi-circuit brake installations are known already in the prior art, which consist of a simple two-circuit brake system, and in which the front axle is braked by one circuit and the rear axle by the other circuit. This simple two-circuit brake system entails the disadvantage that in case of failure of a brake circuit, the vehicle is braked considerably more poorly than with intact brake circuits, especially in case of failure of the brake circuit braking the front wheels since during braking the rear wheels of the vehicle are unloaded so that the rear wheel brakes can be designed only for a small braking. Additionally, so-called "expanded two-circuit brake systems" are known in the prior art in which the two front wheels and one rear wheel are braked with one brake circuit each or both front wheels and both rear wheels are braked with one brake circuit and only the two front wheels are braked with the other brake circuit or in which, in conjunction with two-circuit disk-brakes, all four wheels are braked by each circuit. These so-called "improved two circuit brake systems" offer certain advantages with respect to the generally customary simple, two-circuit brake system (separate front and rear axle), however, they cannot withstand a critical examination in numerous points. Theoretically, these "expanded two-circuit brake systems" achieve a higher braking during failure of one brake circuit than the simple two-circuit brake system. In practice, however, limitations are imposed on the braking operation by reason of the unstable driving behavior, for example, by reason of the inclined pulling of the vehicle in case of braking of three wheels. Additionally, these "expanded two-circuit brake systems" include a larger number of sealing places and brake hoses compared to the simple two-circuit brake system so that the danger of failure of the brake due to leakage places or line ruptures is considerably increased. Furthermore, with the "expanded two-circuit brake system" the entire brake installation fails with thermal overload, i.e., during overheating of only one wheel brake whereas with the simple two-circuit brake system, one circuit remains intact.

Further disadvantages result in the "expanded two-circuit brake systems" in that the constructive manufacturing and assembly expenditures are very considerable by reason of the many brake hoses and connections, for example, at the two circuit disk brakes which have to be equipped each with a double saddle and in which, for purposes of venting these brake saddles, the wheels of the vehicle have to be partially removed.

The present invention is concerned with the task to decisively improve the safety of the brake installation and simultaneously to avoid the aforementioned disadvantages.

The underlying problems are solved in accordance with the present invention in that the hydraulic system of the brake installation is constructed as three-circuit brake system or as four-circuit brake system. It is thereby particularly advantageous if, with a three-circuit brake system, for example, the first brake circuit brakes one front wheel, the second brake circuit the other front wheel, and the third brake circuit the two rear wheels of the vehicle. As a result of this advantageous division and distribution of the brake circuits, a double safety against total failure of the brake installation is achieved. During failure of only one circuit, in the most unfavorable case the braking is considerably higher than during the failure of the front axle circuit of a prior art two circuit brake system notwithstanding equal pedal force. During the failure of two circuits in the multi-circuit brake system of the present invention, approximately the same braking is achieved as in the case of failure of one circuit of the simple two circuit system.

Whereas, with an "expanded two-circuit brake system" the entire brake installation may fail in case of thermal overload or overheating of one wheel brake, only one circuit fails in case the vehicle is equipped with a three-circuit brake installation whereas the two other brake circuits remain intact. Only one brake line and one brake hose lead to each wheel of the vehicle. The number of sealing places and brake hoses is therefore no larger than with the simple two-circuit brake system with the same line lengths so that the danger of failure of the brake installation as a result of leakage places is not increased.

Consequently, no additional pedal reserves are necessary by reason of the same expansion and the same storage capacity or volume.

Also, the constructive expenditures are not increased in case of the equipment of a vehicle with a three-circuit brake system according to this invention compared to a customary two-circuit brake system; for the simple brake-saddles may be used at the disk brakes whereas with an improved two-circuit brake system, double-brake saddles are necessary at the disk brakes. The pedal path losses and the pedal forces therefore remain the same, for example, in case of failure of the rear axle circuit compared to the two circuit system and, in the most unfavorable case, namely, in case of failure of a front wheel circuit, are considerably smaller than in case of failure of a front axle circuit of a two-circuit system. The stability of the vehicle equipped with a three-circuit brake system against over-braking of the rear axle in case of failure of one circuit is not impaired in contradistinction to the stability of the vehicles with "Improved two-circuit brake systems."

Since the customary commerically available, simple-brake saddles are used, the venting of the brake installation according to the present invention is without problem, i.e., no removal of the wheels is necessary.

It is particularly appropriate if the roll radius at the front wheels is constructed small and preferably zero or negative, which means that the front wheels must be so suspended that the point of intersection of the steering axis with the road plane lies as much as possible in proximity to the point of wheel contact and preferably outside the wheel track. It is prevented by this constructive measure that in case of failure, for example, of a front wheel brake circuit, the vehicle breaks out laterally; for with a roll radius of approximately zero, practically no moment about the steering axis and therewith no steering deflection is produced in case of braking.

The three circuit brake installation requires instead of the simple tandem-master brake cylinder of a two-circuit brake installation, a triple-tandem-master brake cylinder with three pistons disposed one behind the other. However, the structural expenditure is increased only insignificantly by a triple-tandem-master brake cylinder and the brake installation thereby remains favorable in price. The installation of a brake-locking regulating system is possible without large complications and with acceptable additional expenditures.

According to the same principle, the brake installation may also be subdivided into four separate brake circuits. The aforementioned advantages remain preserved thereby or would be still further refined, only the structural expenditure for the master brake cylinder would be larger.

Accordingly, it is an object of the present invention to provide a multi-circuit brake installation for vehicles which avoids the aforementioned shortcomings and drawbacks encountered with the prior art system.

Another object of the present invention resides in a multi-circuit brake installation for vehicles which increases the safety of the vehicle, assures improved braking, and minimizes the consequences of failure of a braking circuit.

A further object of the present invention resides in a multi-circuit brake installation for vehicles which is simple in construction, relatively easy to install and avoids excessive connecting places and line connections.

Still a further object of the present invention resides in a brake installation of the type described above which is relatively inexpensive, yet utilizes for the most part standard parts.

Another object of the present invention resides in a multi-circuit brake installation for vehicles which not only increases the safety of operation but also minimizes the danger of a lateral breaking-out of the vehicle in case of failure of a brake circuit.

These and further objects, features and advantages of the present invention will become more obvious from the following description when taken in connection with the accompanying drawing which shows, for purposes of illustration only, two embodiment in accordance with the present invention, and wherein:

FIG. 1 is a schematic view of a three-circuit system in accordance with the present invention;

FIG. 1A is a schematic view similar to FIG. 1, only showing a four-circuit system; and FIG. 2 is a somewhat schematic elevational view of the wheel suspension of a steerable front wheel for use with the brake installation in accordance with the present invention.

Referring now to the drawing, and more particularly to FIG. 1, in the illustrated three-circuit brake system, brake lines and brake hoses 4 lead from the triple-tandem-master brake cylinder generally designated by reference numeral 1 which includes the piston rod 2 and the three pistons 3, to the disk brakes 5 illustrated in this figure. The pressure space 6 of the triple-tandem-master brake cylinder 1 is connected with the disk brake 5 of the right front wheel, the pressure space 7 with the disk brake 5 of the left front wheel and the pressure space 8 by way of a further brake line 4 and the distributor 9 with the disk brakes 5 of the two rear wheels. The arrows at the brake disks indicate the direction of rotation of the disks during forward drive. In case of failure, for example, of the brake circuit which is connected with the pressure space 8, the piston rod 2 together with the piston 3 is moved up to the center piston and only thereafter occurs the brake effect of the two brakes which are connected with the pressure spaces 6 and 7. The pistons are pushed together correspondingly if one of the two brakes fails which are connected with the pressure spaces 6 or 7.

The wheel suspension of a front wheel particularly useful for the present invention can be seen from FIG. 2. The wheel 10 rests vertically or perpendicularly on the road surface 11 and the wheel contact point 12 lies on the line of intersection of the wheel plane with the plane of the road surface. The steering axis 13 which passes through the steering knuckle pin 14 that connects the upper transverse guide member 15 with the lower transverse member 16, intersects with its extension the plane of the road surface 11 at the point 17 outside of the wheel track so that the negative roll radius results from the distance of the two points 12 and 17 in the plane of the road surface 11. If the point 17 is located inside of the wheel track, i.e., to the right of point 12, then the roll radius is positive.

FIG. 1A shows a four-circuit modification with a separate circuit for each wheel. Two pressure spaces 8' and 8'' are used in place of the single space 8 and distributor 9 of the FIG. 1 embodiment.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A multi-circuit brake installation for a vehicle of the type having rear wheels and steerable front wheels; said installation comprising:

brakes at each of said front wheels, a common master cylinder having a plurality of separate pressure spaces for accommodating braking fluid, separate brake circuits for communicating braking fluid from respective ones of said pressure spaces to respective ones of the brakes at the front wheels, said brake circuits being formed with respective separate fluid lines leading directly from respective ones of said separate pressure spaces to respective ones of the brakes at the front wheels such that failure of one of said brake circuits for the brakes at one of said front wheels will not cause failure of the brake circuit for the brakes of the other of said front wheels, the brake circuit for the brakes at one of said front wheels being interconnected with the brake circuit for the brakes at the other of said front wheels only by way of the respective separate fluid lines leading directly to respective separate pressure spaces of the common master cylinder, and steering connecting means for connecting the steerable front wheels to the vehicle steering system such that the front wheels have a negative roll radius.

2. A multi-circuit brake installation for a vehicle with a steerable front wheel according to claim 1, characterized in that the roll radius at the steerable front wheels is relatively small.

3. A multi-circuit brake installation according to claim 2, characterized in that said common master cylinder is a triple-tandem-master brake cylinder with three pistons disposed one behind the other.

4. A multi-circuit brake installation according to claim 1, characterized in that the roll radius is nearly zero.

5. An installation according to claim 1, characterized in that said connecting means includes: a steering knuckle pin associated with each front wheel, an upper transverse guide member connected to an upper point on said knuckle pin, and a lower transverse guide member connected to a lower point on said knuckle pin, the line between the upper and lower points defining a steering axis which intersects with a horizontal road surface at a point outwardly with respect to a vertical wheel plane extending upwardly from the normal wheel contact point with the road surface.

6. A multi-circuit brake installation according to claim 5, characterized in that a triple-tandem-master brake cylinder with three pistons disposed one behind the other is provided as master brake cylinder means.

7. A multi-circuit brake installation according to claim 5, characterized in that the brake installation is constructed as three-circuit brake system.

8. An installation according to claim 5, wherein each of the brakes controlled by the respective brake circuits are disk brakes.

9. An installation according to claim 8, wherein each of said disk brakes is of the type utilizing a simple saddle as contrasted to double-brake saddles.

10. An installation according to claim 5, wherein said common master cylinder is constructed as a cylinder with a plurality of pistons disposed inside of said cylinder one behind the other, each of said separate pressure sources being bounded on one side by one of said pistons and on the other side by one of another of said pistons and an end wall of said cylinder.

11. An installation according to claim 10, wherein each of the brakes controlled by the respective brake circuits are disk brakes.

12. An installation according to claim 1, characterized in that four braking circuits are provided such that said rear wheels have separate braking circuits.

13. An installation according to claim 12, wherein each of the brakes controlled by the respective brake circuits are disk brakes.

14. An installation according to claim 1, wherein said common master cylinder is constructed as a cylinder with a plurality of pistons disposed inside of said cylinder one behind the other, each of said separate pressure sources being bounded on one side by one of said pistons and on the other side by one of another of said pistons and an end wall of said cylinder.

15. An installation according to claim 14, wherein each of the brakes controlled by the respective brake circuits are disk brakes.

16. An installation according to claim 15, wherein a total of three separate braking circuits are provided, a first and a second of said circuits controlling brakes at respective ones of said steerable front wheels and a third of said circuits controlling a pair of rear vehicle wheels.

17. An installation according to claim 15, wherein a total of four separate braking circuits are provided for controlling respective brakes at each of two steerable front and two rear wheels.

18. An installation according to claim 15, wherein each of said disk brakes is of the type utilizing a simple saddle as contrasted to double-brake saddles.

19. An installation according to claim 1, wherein each of the brakes controlled by the respective brake circuits are disk brakes.

* * * * *